United States Patent Office 2,940,996
Patented June 14, 1960

2,940,996

X-RAY DIAGNOSTIC AGENT

Domenick Papa, Bloomfield, N.J., assignor to Schering Corporation, Bloomfield, N.J., a corporation of Delaware No Drawing. Filed Jan. 28, 1952, Ser. No. 268,685

3 Claims. (Cl. 260—521)

This invention relates to a new group of compounds having X-ray contrast properties, and to a process for manufacturing the same.

More particularly, the invention relates to polyiodinated phenyl fatty acids with specific selectivity for visualization of the gall bladder. Of significant interest is the concomitant visualization of the gall bladder ducts, a property not shown by any gall bladder dyes in clinical use.

The compounds of the present invention include the free acids and salts of the general formulas

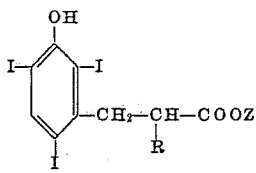 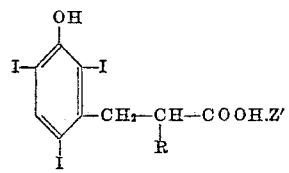

wherein R is a lower alkyl group of from 1 to 3 carbon atoms and Z is hydrogen or an alkali or alkaline earth metal, such as sodium, potassium, lithium, calcium or magnesium, while Z' is a non-toxic amine. Of this limited group of compounds, the substances wherein R has 2 or 3 carbons show the most favorable combination of properties; that is, non-toxicity, absence of side reactions, optimum visualiziation of the gall bladder and ducts, and significant absence of unabsorbed dye in the colon.

The compounds of the present invention can be prepared from m-hydroxy benzaldehyde by the series of steps illustrated in the following equations:

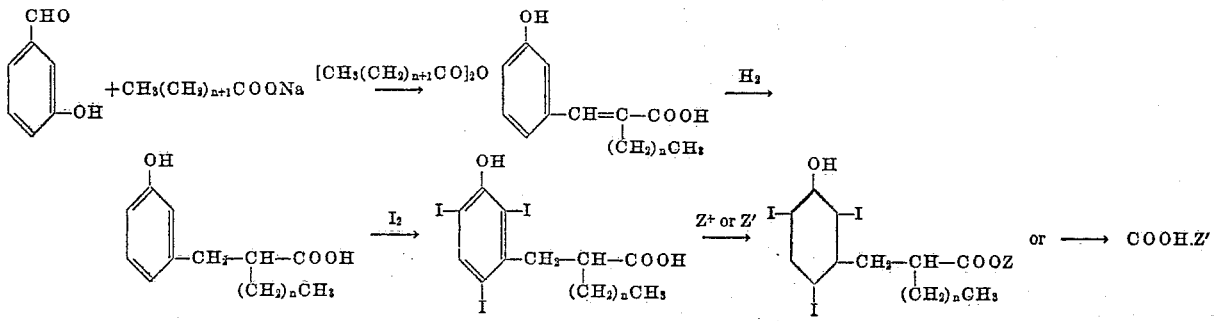

wherein $n$ is a whole number from 0 to 2.

The initial condensation of the m-hydroxy benzaldehyde can be carried out with the alkali metal salt of the aliphatic acid and the acid anhydride, or the free acid may be utilized, using an equivalent amount of potassium acetate or triethylamine. Although by the latter procedure the yields of the substituted cinnamic acid are not comparable to those obtained by the alkali metal salt method, such free acid procedure offers the advantage that the alkali metal salt does not have to be prepared in anhydrous condition. Reduction of the cinnamic acid to the propionic acid may be carried out by any of the known catalytic hydrogenation methods such as Raney nickel catalyst in alkaline or alcoholic solution, platinum oxide catalyst in alcoholic solution, Raney nickel aluminum alloy in alkaline solution, as well as by other methods, such as the use of sodium amalgam. For the most part, the substituted propionic acids are low melting solids and it has been found advantageous for the production of these compounds in quantity to purify the cinnamic acid prior to reduction in order to permit direct iodination of the reduction product without recourse to any purification of the latter product. This is possible regardless of the procedure used for reduction, since the reduced product can be isolated from the reaction mixture by ether extraction. In certain cases, the reduction product in alkaline solution can be used directly for the iodination, following the removal of the catalyst and the proper adjustment of the alkali concentration.

The iodination of the substituted propionic acids can be carried out by the use of the iodine-potassium iodide method in alkaline solution or by the use of iodine monochloride in dilute acid solution. Occasionally both methods yield some diiodo compound, which is probably 2,4-disubstituted. In this case, further iodination of the diiodo substance will yield the triiodo compound. The triiodo compounds of this invention have been obtained as white to tan-colored crystalline compounds which are soluble in sodium bicarbonate solution and also in the usual organic solvents.

The compounds of the present invention are preferably administered in the form of the free acid in tablets containing the usual carriers and binders, such as starches, sugars, gums, soaps, etc. They can also be administered as the sodium salts or calcium salts or salts with non-toxic organic amines such as mono-, di-, and tri-ethanolamines and the corresponding propandamines. Another very suitable pharmaceutical form for the compounds of this invention is as a suspension of either the free acids or the salts, such suspension containing about 3 g. of the free acid and slightly more of the salt, corresponding to its greater molecular weight.

The powdered diagnostic agent can be dissolved or suspended in milk, water, orange juice, or other potable liquid; while the free acids can also be put up in 15 cc. ampules, suspended in water containing pectin, methyl cellulose, or kaolin or in other suspending and antacid preparations. With a dose of about 3 g., a satisfactory X-ray picture can be obtained in about 10 to 16 hours.

The following examples describe in greater detail, and by way of illustration, satisfactory procedures for the manufacture of the compounds of the invention:

EXAMPLE 1

*α-Ethyl-β-(2,4,6-triiodo-3-hydroxyphenyl) propionic acid*

The intermediate α-methyl-m-hydroxycinnamic acid, is prepared as follows: Two moles (244 g.) of m-hydroxybenzaldehyde, 222 g. (2 moles) of anhydrous sodium butyrate and 937 g. (6 moles) of butyric anhydride are heated at 115–120° with stirring for twenty hours. After the reaction mixture is decomposed with water, the excess butyric acid is removed by steam distillation. The residual butyroxy compound is made alkaline with concentrated sodium hydroxide and heated in the steam bath with stirring for six hours until hydrolysis is complete. Upon acidification, the product separates out as an oil and is extracted with chloroform. The chloroform residue is steam distilled to remove additional butyric acid and the semi-solid residue is dissolved in sodium bicarbonate solution, treated with charcoal, filtered and acidified. The solid α-ethyl-3-hydroxycinnamic acid is recrystallized from water and is obtained as a white to pale yellow crystalline compound.

Reduction of the cinnamic acid to α-ethyl-β-(3-hydroxyphenyl) propionic acid is carried out by the following two methods:

(1) Raney nickel alloy: Twenty grams of α-ethyl-3-hydroxycinnamic acid dissolved in 2320 cc. of 5% sodium hydroxide solution is reduced with 70 g. of Raney nickel-aluminum alloy. After filtration of the nickel, the filtrate is acidified with hydrochloric acid and extracted with ether. The dried ethereal extract is evaporated to dryness and the obtained gummy residue used without further purification in the iodination step.

(2) Catalytic hydrogenation: The α-ethyl-3-hydroxycinnamic acid is dissolved in sufficient 5% sodium hydroxide solution to neutralize both the carboxylic acid and phenolic groups. Raney nickel catalyst (10%) is added and the reduction run at low pressure and room temperature. After filtration of the catalyst, the alkaline solution can be used directly in the iodination employing the iodine-potassium iodide procedure. For the alternative iodination procedure, the alkaline solution is acidified and the semisolid acid used directly in the iodine monochloride procedure.

IODINATION (1) Iodine-potassium iodide method: The alkaline solution from the reduction with Raney nickel catalyst is used directly. For a 0.1 mole run, an additional 25 g. of alkali are added and the volume adjusted to 800 cc. A solution of 76.2 g. of iodine and 76.2 g. of potassium iodide is made up in 400 cc. of water and the iodine-potassium iodide solution added to the hydroxy compound slowly with stirring. After the addition of the iodine solution is completed, ice is added to the reaction mixture, then it is acidified with sodium bisulfite. The filtered product is purified by solution in sodium bicarbonate and bleaching with sodium bisulfite and charcoal. The triiodo compound is finally recrystallized from methanol-water and is obtained as a white crystalline solid.

(2) Iodine monochloride method: To ten g. of the reduction product suspended in 32.5 cc. of 6 N hydrochloric acid at 70° C., there is added a solution of 28.8 g. of iodine monochloride in 62.5 cc. of 6 N hydrochloric acid. The mixture is stirred and kept at 70° for one hour, then 148 cc. of water are added over a 15 minute period. During the following five hours 295 cc. of water and 8.2 g. of iodine monochloride are added. On cooling, the insoluble material crystallizes and is filtered. The crude product is dissolved in sodium bicarbonate solution with heating, bleached with sodium bisulfite, treated with charcoal and filtered. On acidification, a light tan product is obtained, which upon recrystallization first from methanol-water, then from benzene-petroleum ether, gives the triiodo compound as a white crystalline compound.

EXAMPLE 2

α-Methyl-β-(2,4,6-triiodo-3-hydroxyphenyl) propionic acid

This compound is prepared by the procedure of Example 1, substituting propionic anhydride and anhydrous sodium propionate for the butyric compounds of said Example 1. The triiodo compound is obtained as a white crystalline solid after recrystallization from benzene-petroleum ether.

In the preparation of the intermediate α-methyl m-hydroxy cinnamic acid, the anhydrous alkali metal salt procedures as well as the free acid procedure is used. The latter procedure is carried out as follows: A mixture of 244 g. (2 moles) of m-hydroxy benzaldehyde, 178 g. (2 moles) of propionic acid, 780 g. (6 moles) of propionic anhydride and 202 g. of anhydrous triethylamine is heated for 25–30 hours at 120–125° C. After cooling to about 60°, the anhydride is decomposed cautiously with warm water and the resulting mixture steam-distilled. The steam distillation residue is then handled as described for the sodium salt procedure of Example 1.

EXAMPLE 3

α-i-Propyl-β-(2,4,6-triiodo-3-hydroxyphenyl) propionic acid

This triiodo compound is prepared by the procedure of Example 1, using isovaleric acid and isovaleric anhydride. The triiodo propionic acid is a white crystalline compound after recrystallization from benzene-petroleum ether.

EXAMPLE 4

α-n-Propyl-β-(2,4,6-triiodo-3-hydroxyphenyl) propionic acid

Prepared by the procedure of Example 1, using valeric acid and valeric anhydride, the triiodo compound is a white crystalline solid which can be recrystallized from benzene-petroleum ether.

The above procedure can be varied by employing 3-hydroxy-2,4,6-triiodo-benzaldehyde, but in such case, care must be employed in the hydrogenation of the obtained triiodo cinnamic acid to avoid splitting off of iodine.

I claim:

1. Process for the manufacture of compounds suitable for use as X-ray diagnostic agents, which comprises condensing 3-hydroxy benzaldehyde with a member of the group consisting of aliphatic carboxylic acids having from 3 to 5 carbon atoms and their alkali metal salts in the presence of the anhydride of the acid, hydrogenating the aliphatic double bond of the obtained α-substituted cinnamic acid, and tri-iodinating the reduced compound to form a compound of the formula

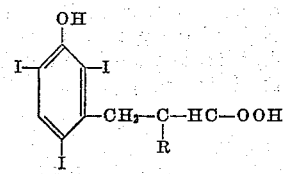

wherein R is an alkyl group of 1 to 3 carbon atoms.

2. Process for the manufacture of a compound suitable for use as an X-ray diagnostic agent which comprises condensing 3-hydroxy benzaldehyde with sodium butyrate in the presence of butyric anhydride, hydrogenating the aliphatic double bond of the obtained α-substituted cinnamic acid, and tri-iodinating the reduced compound to produce α-ethyl-β-(2,4,6-triiodo-3-hydroxyphenyl) propionic acid.

3. The process for preparing an acid of the formula

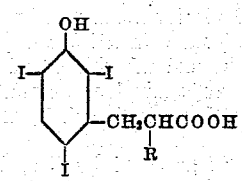

wherein R is an alkyl radical of 1 to 3 carbon atoms which comprises heating m-hydroxybenzaldehyde with an acid anhydride of the formula $(RCH_2CO)_2O$ and an alkali metal salt of an acid of the formula $RCH_2COOH$, reducing the double bond of the resulting substituted cinnamic acid of the formula $$m\text{-HOC}_6\text{H}_4\text{CH}=\text{C}-(\text{R})\text{COOH}$$

to give a substituted propionic acid of the formula $$m\text{-HOC}_6\text{H}_4\text{CH}_2\text{CH}(\text{R})\text{COOH}$$

and iodinating the latter by heating it with an excess of iodine monochloride in acid solution.

References Cited in the file of this patent

UNITED STATES PATENTS

| | | |
|---|---|---|
| 2,400,433 | Natelson et al. | May 14, 1946 |
| 2,469,415 | Schwenk et al. | May 10, 1949 |
| 2,528,542 | Papa et al. | Nov. 7, 1950 |

FOREIGN PATENTS

| | | |
|---|---|---|
| 517,382 | Great Britain | July 25, 1939 |